United States Patent
Baumann

[11] Patent Number: 5,583,483
[45] Date of Patent: Dec. 10, 1996

[54] METHOD FOR TIRE PRESSURE WARNING

[75] Inventor: Matthias Baumann, Boeblingen, Germany

[73] Assignee: Mercedes-Benz AG, Germany

[21] Appl. No.: 291,566

[22] Filed: Aug. 16, 1994

[30] Foreign Application Priority Data

Aug. 16, 1993 [DE] Germany ............... 43 27 492.7

[51] Int. Cl.⁶ .................................................. B60C 23/00
[52] U.S. Cl. ........................... 340/444; 340/432; 340/433; 73/146; 73/146.2
[58] Field of Search ................... 340/444, 443, 340/442; 73/146.3, 146.2, 146

[56] References Cited

U.S. PATENT DOCUMENTS

| | | | |
|---|---|---|---|
| 3,613,075 | 10/1969 | Griffiths et al. | 340/58 |
| 3,691,524 | 9/1972 | Frost et al. | 340/58 |
| 3,707,701 | 12/1972 | Neu | 340/58 |
| 4,355,298 | 10/1982 | Jessup | 340/58 |
| 4,905,783 | 3/1990 | Bober | 180/142 |
| 5,218,862 | 6/1993 | Hurrell, II et al. | 340/444 |
| 5,239,469 | 8/1993 | Walker et al. | 340/444 |
| 5,343,741 | 9/1994 | Nishihara et al. | 340/444 |
| 5,345,217 | 9/1994 | Prottey | 340/444 |

FOREIGN PATENT DOCUMENTS

| | | |
|---|---|---|
| 0291217B1 | 5/1991 | European Pat. Off. . |
| 0441600A2 | 8/1991 | European Pat. Off. . |
| 0441599A2 | 8/1991 | European Pat. Off. . |
| 0489563A1 | 6/1992 | European Pat. Off. . |
| 0489562A1 | 6/1992 | European Pat. Off. . |
| 0579446A1 | 1/1994 | European Pat. Off. . |
| 4102769A1 | 8/1992 | Germany . |

*Primary Examiner*—Jeffery Hofsass
*Assistant Examiner*—Ashok Mannava
*Attorney, Agent, or Firm*—Evenson, McKeown, Edwards & Lenahan P.L.L.C.

[57] ABSTRACT

Method for tire pressure warning in a motor vehicle in which, instead of direct pressure measurement, the tire pressure is monitored indirectly by recording the dynamic rolling circumference of the tire and, in this way, to dispense with sensors, in particular if wheel speed sensors have already been installed in the vehicle.

The method works on the basis of a wheel speed balance, within which speed scaling factors are determined. By comparing these scaling factors in pairs, determining the maximum deviation and checking whether a particular threshold value has been exceeded, a reliable tire pressure warning can be implemented with little outlay, in particular in the case of a wheel speed balance for each axle.

9 Claims, 3 Drawing Sheets

METHOD FOR TIRE PRESSURE WARNING

BACKGROUND AND SUMMARY OF THE INVENTION

The present invention relates to a method for tire pressure warning in a motor vehicle.

In principle it is known, in order to save having other systems which are complex in terms of sensors, to carry out a warning of incorrect, i.e. too low or even too high, tire air pressure during travel by evaluating the dynamic tire rolling circumferences, i.e. from wheel speed sensor signals. This is advantageous particularly if appropriate sensors are already available in the vehicle, for example as ABS speed detectors. The dynamic rolling circumference of a wheel changes as a function of the tire air pressure and thus leads to different wheel rotation speeds during slip-free, straight-ahead travel. An air pressure drop from 2.4 bar to 1.9 bar, for example, causes a wheel speed which is faster by about 0.3% at the wheel with too low air pressure within a mean speed range between 60 km/h and 100 km/h despite the vehicle speed remaining the same. An air pressure loss can therefore be derived from the wheel speed differences. Using this method, a relative air pressure loss from one wheel to another can be established.

In a warning method according to U.S. Pat. No. 3,707,701, a signal is produced for each full revolution of a wheel, and the phase relation between the signals from different wheels is observed, a warning report taking place in the case of the period length being too short.

A tire pressure warning method for airplane tires is known from U.S. Pat. No. 4,355,298, in which the wheel speeds of the two tires are recorded and compared with one another, the resulting difference, in turn, being compared with a reference value. The momentary transverse speed is thus intended to be taken into consideration in order to prevent a speed difference, which is still relatively small at low speeds and is based not on a pressure loss but on a different interfering parameter, e.g. unequal static tire circumference, leading to the pressure warning responding incorrectly at relatively high speeds.

A difficulty in this type of indirect tire pressure determination results from the fact that wheel speed differences can also occur in the case of correct tire air pressure, e.g. due to braking or driving slip, cornering, differing axle load distribution, loading, use of tires of different design, make and/or running performance, as well as temperature differences and differing "swelling" of the tires caused by centrifugal force at a relatively high speed. These effects must be taken into consideration as far as possible for tire pressure warning by means of wheel speed measurement.

A tire pressure control method disclosed in the German Patent Document DE 4,102,769 A1 provides for dynamic wheel circumference differences, which are caused by static tire circumference differences, to be determined by means of a separate calibration journey with straight ahead travel at a correctly set air pressure and to be stored in a computer. Cornering is taken into consideration in this method by means of a special cornering model which results in two wheel frequency equations. Wheel slip or loading-related speed differences are compensated by introducing a parameter which can be eliminated in this air pressure control model in such a way that the evaluating computer treats the input parameters in a single equation as a control function, an air pressure loss being assumed if this control function assumes values above a predetermined threshold value for a relatively long time.

In U.S. Pat. No. 3,691,524, the influence of cornering is counteracted by the fact that a warning report takes place only if a speed difference occurs either only between the front wheels or only between the rear wheels. At the same time, a warning report is suppressed if the speed difference detected exceeds a specific value since this is interpreted as spinning of the relevant wheel.

The variant of a tire pressure warning method known from U.S. Pat. No. 3,613,075 provides for the warning system to be suppressed at too low a speed since in this case it is assumed that spinning of the wheels occurs above all within this low speed range.

Tire pressure warning methods are known from European Patent Documents EP 0,291,217 B1, EP 0,441,599 A2 and EP 0,441,600 A2, which methods, while individually differing in the recording of the wheel speeds, all produce a warning signal on the basis of the same mathematical relations. One of these relations includes, inter alia, essentially the sum of the two differences between the wheel speeds of the wheels on the same axle. This procedure allows the sensor system and control of an antilock brake system (ABS) also to be used at the same time for the tire pressure warning and it automatically takes cornering into account. It is additionally known from these publications to suppress the tire pressure warning during braking and to carry out a calibration during drive-free, straight-ahead travel at more than 20 km/h. Based on the evaluation arithmetic selected in these documents, however, a virtually simultaneous tire pressure drop, for example, can only be recognized at diagonally opposite wheels, but not at wheels on the same axle or on the same side.

An object of the present invention is to provide a reliable tire pressure warning method which also takes into account the different types of influences on the tire pressure in the best possible manner with a given outlay.

This and other objects are achieved by the present invention which provides a method for providing a tire pressure warning in a motor vehicle, comprising the steps of: a) performing a wheel speed balance in which wheel speed scaling factors for each wheel, monitored in terms of tire pressure, are formed by measuring wheel speeds during travel of the motor vehicle without braking above a minimum speed with a degree of cornering below a predetermined limit value for cornering and a driving torque below a predetermined limit value for driving torque; b) combining the wheels, monitored in terms of tire pressure, in pairs and calculating a difference of the associated wheel speed scaling factors for each pair of wheels; c) determining a greatest difference of the wheel speed scaling factors between the pairs of wheels; d) checking whether the greatest difference determined is greater than a predetermined threshold value, and if so: d.1) repeating steps a) to d) if a predetermined number of cycles has not yet been reached, and otherwise, d.2) output a warning signal to display an excessive tire pressure deviation.

The present invention provides the basis for taking the wheel speed differences into account which are not caused by a significant tire pressure deviation. In this case, the wheel speed balance which is carried out first eliminates the deviations otherwise occurring due to braking and driving slip and cornering. In such a wheel speed balance, the wheel speeds are measured during travel as soon as suitable conditions are recognized during travel which allow the tire circumference to be recorded broadly independently of slip and bends. For this purpose, suitable limit values are prescribed and a balance is initiated when there is a sufficient amount of straight ahead travel with little driving torque above a particular minimum speed and without braking. Such a wheel speed balancing method, such as is used as a basis for the present tire pressure warning, is described in greater detail later. In this wheel speed balancing method, wheel speed scaling factors are formed, by means of which the measured wheel speeds, which may possibly differ from one another even in the case of rolling straight ahead without driving torque, are balanced with one another, i.e. corrected wheel speeds which have been approximated to one another are calculated, which can be fed as input parameters to a subsequent driving or wheel slip control system, such as a permanent four-wheel drive, ABS or-driving slip control (DSC), and also to a control for the present tire pressure warning method. This automatic, sensitive speed balance of the wheels, in which a precision of at most 0.1% deviation of all four corrected wheel speeds with one another is achieved for slip-free straight-ahead rolling, forms the basis of the present tire pressure warning method which is capable of reliably recognizing a pressure loss above 0.5 bar and, at the latest, at 0.8 bar depending on the outlay and sensor system. This tire pressure warning method can be used particularly advantageously in vehicles which already have the appropriate sensor system, e.g. those with a permanent four-wheel drive and/or ABS and/or DSC.

By combining the wheels in pairs and calculating the difference between the associated scaling factors and carrying out the following evaluation of the resultant differences, a tire pressure loss or even excess tire pressure can be recognized reliably in each case in one of the two wheels. The steps of the method are expediently carried out with a predetermined number of cycles which can be, in particular, considerably greater than one so that repetition of the steps of the method takes place in order to check whether a detected deviation is also reproduced in a subsequent determination or is based merely on a single incorrect measurement or a singularity in the driving state, e.g. driving over a curb.

Certain embodiments of the invention provide for the wheel speed balance to be carried out in each case in pairs with wheels on the same axle. This eliminates influences on the tire rolling circumference as a result of differing loading and axle load distribution and as a result of different makes, types and profile depths of the tires, assuming the customary procedure of mounting tires of the same make and the same type and with the same running performance at both ends of one axle. As a result, at the same time differing "swelling" of tires of different makes and types at a relatively high speed are also eliminated. As long as there is no mixing of the tires on one axle, the two tires behave in a comparable manner in terms of their dynamics such that forming the difference eliminates their respective effect on the dynamic tire rolling circumference.

Certain embodiments of the invention have an advantageous effect on the rapidity of a tire pressure warning in that the number of cycles is preselected as a function of the maximum difference, in particular in such a way that, in the case of a relatively large difference, fewer repetition cycles are driven. This is because a greater maximum difference between two scaling factors already allows a tire pressure abnormality to be recognized with greater certainty than a comparatively small difference which, in terms of magnitude, almost fits into the range of normal scaling factor differences with a correct air pressure.

Certain advantageous embodiments of the method according to the present invention provide for the tire which has the pressure deviation to be determined additionally after the output of a tire pressure warning signal so that this can be indicated to the driver, e.g. by means of an appropriate information display unit.

Other objects, advantages and novel features of the present invention will become apparent from the following detailed description of the invention when considered in conjunction with the accompanying drawings.

DETAILED DESCRIPTION OF THE DRAWINGS

The method illustrated in the figures provides a tire pressure warning for a passenger car to increase driving safety in order to warn the driver in good time, in particular before an air pressure drop which is critical to safety. Direct tire pressure measuring sensor systems are not used and, instead, the tire pressure is recorded indirectly via the tire rolling circumference which changes with the pressure in an unambiguous manner. The basis of the method is the fact that the dynamic rolling circumference is reduced in the case of an air pressure drop at the tire despite the vehicle speed remaining constant and the wheel rotation speed is thus increased. This procedure reduces the outlay required particularly if the sensor system for determining the wheel speeds is already installed in the vehicle, e.g. in conjunction with a permanent four-wheel drive or a wheel slip control system.

Figure 1:
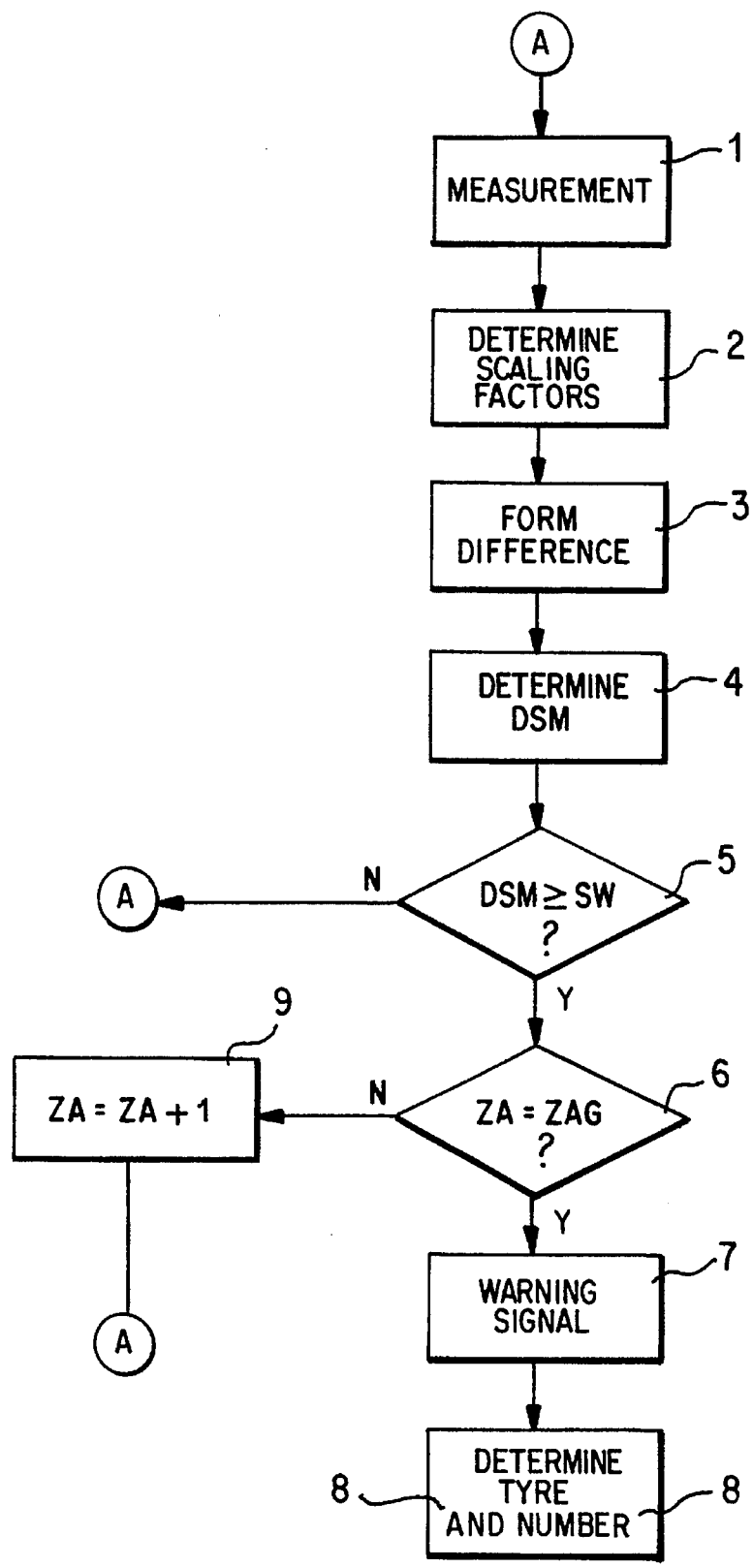
FIG. 1 shows a flow diagram of a tire pressure warning method according to the present invention.

The sequence of the method is initiated at a point A in FIG. 1 in a manner not shown in detail, e.g. by starting the motor. The required input parameters are then recorded (step 1). These are, on the one hand, in a passenger car the four wheel speeds which are measured by means of customary sensors which are, for example, part of an antilock brake system. Additionally, the setting of a brake light switch and thus the presence of a braking operation is monitored, and the motor torque is determined by recording the motor speed and the setting of a throttle flap potentiometer.

A determination of wheel speed scaling factors then takes place within a wheel speed balance (step 2). In this case, it is first checked whether there is at most slight cornering, not too high a motor torque and a specific minimum speed as well as no braking, which is recognized from a comparison of the recorded input parameters with predetermined limit values. If a braking operation or too high a motor torque is recognized, the speed balance is not activated or is stopped. If in this manner sufficiently low-slip straight-ahead travel is recognized, the measured wheel speeds are determined for a new determination of the scaling factors from previous values for these factors, for which purpose an incremental change in the previous scaling factors is carried out in the direction of a difference resulting from the measured wheel speeds, preferably repeating the balancing cycle.

At the end of the wheel speed balance, the measured wheel speeds are multiplied by the newly determined scaling factors in order thus to obtain corrected wheel speeds which take into consideration the fact that the rolling circumferences of the different vehicle tires are not normally of equal size within the precision required for wheel slip control systems or four-wheel drives. Using the scaling factors, the wheel speeds are artificially balanced with one another so that the four-wheel drive system or wheel slip control system only takes the wheel speed differences caused by slip into consideration and no incorrect control occurs due to the use of tires with a different rolling circumference. A detailed description of such a wheel speed balance will be provided later with reference to FIG. 3.

When the wheel speed balance has been carried out, new speed scaling factors are consequently present for each wheel, the initial starting value of the scaling factors being set at 10,000, for example, and the resolution thus being 0.01%. A balance of wheels on the same axle in pairs is provided to determine the speed scaling factors within the tire pressure warning. This eliminates the risk of incorrect warnings which exists if there is differing loading or axle load distribution since the dynamic tire rolling circumference is reduced in the case of greater axle load. Owing to the balance of wheels on the same axle in pairs, differing axle loads have no effect, but are eliminated within the wheel speed balance. Even influences as a result of using different makes and types of tires are eliminated if it is assumed that identical tires are mounted in each case on one axle, which is customary and is even prescribed to a particular extent. Usually the tires on one axle are also mounted or exchanged together so that they have at least approximately the same running performance and thus remaining profile depth. Differing profile depths between the tires on the front and rear axles which would likewise entail differing rolling circumferences therefore likewise do not have an incorrect effect in the case of a wheel speed balance on the same axle. Finally, the wheel speed balance for each axle also automatically takes into consideration the fact that the driving slip at the rear wheel counteracts the swelling of the tire in the case of relatively high speeds whereas the front wheels which are free from driving force or in any case have lower driving force in the case of a permanent four wheel drive with a driving torque distribution focused on the rear expand due to centrifugal force at high speed, as is known, i.e. increase their dynamic rolling circumference.

It is apparent that the present method has the advantage of already taking the above-mentioned influences, not based on tire pressure abnormalities, on the wheel speeds into consideration automatically by means of the speed balance for each axle. Alternatively, certain embodiments of the invention take these influences into consideration explicitly if, for example, additional loading sensors are present or all the wheels are provided with the same tires, and to balance other pairs of wheels with one another if appropriate. If required, the effects of mixing the tire are taken into account by appropriate response thresholds of the tire pressure warning. An indirect identification of the effects of mixing the tires is also possible in that the wheel speeds of the driving wheels are measured during rolling without power and during maximum driving force, and the empirically determined, unambiguous correlation between the driving force and the driving slip is taken into consideration at a given air pressure.

The wheel speed scaling factors which were gained from the wheel speed balance and can also be used for other purposes are then evaluated for a tire pressure warning in such a way that the difference between the scaling factor of the left front wheel and that of the right front wheel and the difference between the scaling factor of the left rear wheel and that of the right rear wheel are formed (step 3).

The amounts of the two differences are then formed and the greater difference (DSM) is determined which represents the more critical case (step 4). The greater difference (DSM) represents the percentage deviation in increments of 0.01% relative to the starting value of 10,000.

This maximum percentage deviation (DSM) is subsequently compared with a preselected threshold value (SW) (step 5). If the deviation determined (DSM) remains below the threshold value (SW), this is interpreted as a correct tire pressure at all the wheels and the program returns to the starting point (A) in order to carry on monitoring the air pressure continuously. If, in contrast, the maximum percentage deviation (DSM) is at or above the preset threshold value (SW), the program continues with the next interrogation step (step 6) in which it is established whether the number of previous program sequence cycles (ZA) has reached a preset limit value (ZAG) for the number of cycles. If this is not the case, the count (ZA) of the number of cycles is increased by 1 (step 9) and the program then returns to the point (A) of the sequence of the method for carrying out a new cycle of the method.

Figure 2:
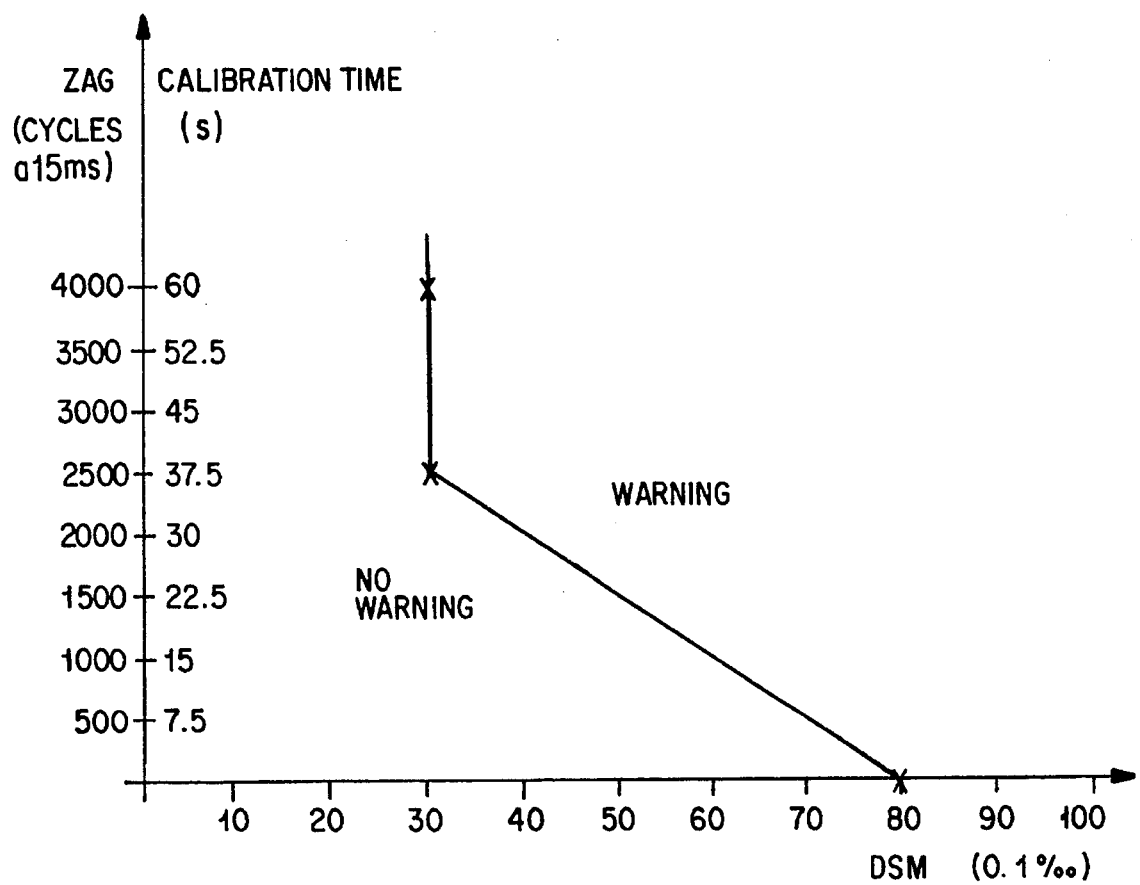
FIG. 2 shows the functional dependence on the number of cycles on the maximum scaling factor difference for the method according to the embodiment of FIG. 1.

If the predetermined limit value (ZAG) for the number of cycles has been reached, this means that an incorrect tire pressure was recognized during an appropriate number of successive cycles of the method. The limit value for the number of cycles is preferably set to be substantially greater than 1 in order to eliminate any single incorrect measurements and, above all, brief tire pressure fluctuations, such as are caused, for example, by driving over a curb, Of course, the counter (ZA) for the number of cycles is set to O at the beginning of a cycle sequence, which is not illustrated explicitly in FIG. 1. The limit value (ZAG) for the number of cycles is fixed after determination of the maximum percentage difference deviation (DSM) as a function of the value of the latter. The predetermined functional dependence of the number of program cycles carried out and the overall calibration time resulting therefrom on the maximum deviation is illustrated in FIG. 2. As can be seen therefrom, the sequence of the method is repeated continuously in accordance with the NO branch in the interrogation step 5 of FIG. 1 as long as the maximum deviation (DSM) remains smaller than the threshold value (SW) which in this case is set at 0.3%. In the case of a greater deviation (DSM), a linearly descending limit value (ZAG) for the number of cycles is selected which reaches the value 1 at DSM=0.8%. This selection of the course of the limit value for the number of cycles takes into account the fact that an incorrect tire pressure can be concluded with greater certainty from a greater determined maximum percentage difference deviation, thus requiring fewer repetition cycles to confirm it. As a result, the overall calibration time, i.e. the recognition period of a pressure deviation, can be greatly reduced in the case of a greater deviation determined, as can be seen from FIG. 2.

If the warning range located to the right of the deviation characteristic for the number of cycles in FIG. 2, i.e. the sequence of the method was repeated as often as preselected and a significant tire pressure deviation was determined in each case, a warning signal is produced (step 7) which reports the tire pressure deviation which can no longer be tolerated, usually an excessive tire pressure loss. This is indicated to the driver via a driver information display unit for the tire pressure warning.

Additionally, the tire with the excessive tire pressure deviation is then determined and likewise indicated to the driver (step 8). To determine the tire with the excessive pressure deviation, firstly the arithmetic mean of all four wheel speed scaling factors is formed from the speed balance, and the difference between the associated scaling factor and the arithmetic mean of the scaling factors is then calculated for each wheel. The maximum amount from these four amounts is determined and the associated tire is recognized as the tire with the significant pressure deviation.

The tire pressure warning method illustrated is consequently capable of providing a reliable tire pressure warning by means of determining the wheel speed. Brake slip, driving slip and cornering are taken into consideration by the selected wheel speed balance, a speed balance for each axle taking into account differing axle load distribution and loading as well as mixing of the tires on different axles.

Using the method of the present invention, a tire pressure warning can be achieved in the case of a pressure loss in the range above 0.5 bar without further additional hardware outlay. For example, an air pressure drop by 0.6 bar from 2.5 bar to 1.9 bar at 60 km/h results in a reduction of the dynamic rolling circumference by 0.33%, a percentage value which has a corresponding effect on the maximum percentage deviation (DSM) of the wheel speed scaling factors, as a result of which the deviation at a threshold value of 0.3% and thus the pressure drop is recognized reliably.

Additionally, the method of the present invention can be extended or modified without difficulty if even greater precision is required. By means of additional sensor systems, temperature differences of individual tires or mixing of the tires, for example, can be taken into consideration with greater accuracy. Furthermore, it should be noted that the present method is also capable of recognizing an approximately simultaneous tire pressure loss from two vehicle wheels on the same side in the case of a wheel balance in pairs in each case of two vehicle wheels on the same axle or of two diagonal vehicle wheels. The method can be used both for vehicles with a permanent four-wheel drive and for vehicles driven only on one axle, e.g. the rear axle.

A wheel speed balancing method that can be used in the present invention is also used for a motor vehicle having a drive or wheel-slip control system in which the need arises for sensitive wheel balancing for the purpose of actuating a driver information lamp which informs the driver of the current driving condition.

Figure 3:
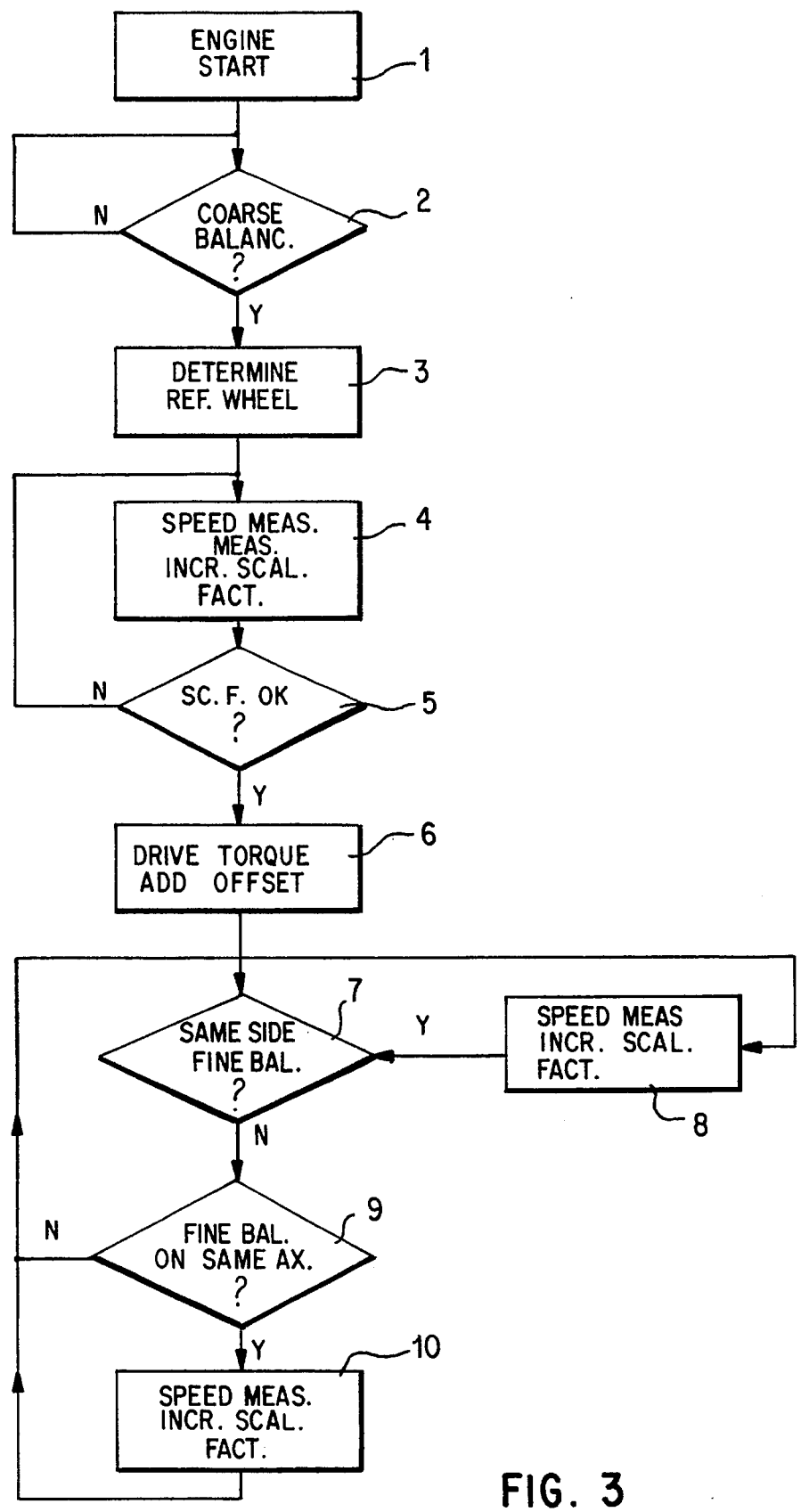
FIG. 3 shows a flow diagram of a wheel speed balancing method for a motor vehicle driving or wheel slip control system, which can be used in the present invention.

As seen in FIG. 3, the method begins after an engine start (step 1) with quick calibration, carried out non-recursively, for the purpose of coarsely balancing the wheel speeds. Tire rolling radii which deviate substantially from the standard rolling radius such as, for example, during the use of an emergency spare wheel or in the case of mounting a tire of the wrong size, are corrected thereby. By way of introduction, an interrogation is made as to whether conditions expected for coarse balancing are fulfilled (step 2), with the following conditions being monitored: absence of a braking process, detected from monitoring the brake light contact; overshooting of a minimum speed of 45 km/h; presence of a sufficient amount of straight-ahead driving detected from overshooting limiting values of differentiated left/right deviation signals of measured wheel speeds over a sufficiently long period of time, for example 4.5s; and undershooting limiting values of the vehicle acceleration, for example below 0.5 m/s$^2$, detected by determining the average rear axle wheel acceleration.

If one of these conditions is not fulfilled, a new interrogation is made. The abovementioned coarse balancing conditions ensure the detection of driving on μ-split roadways or of aquaplaning points, so that the quick calibration for coarse balancing is halted.

Finally, if a driving condition fulfilling all the coarse balancing conditions is reached, the first step is to determine a reference wheel which is used for balancing purposes (step 3). For this purpose, the four wheel speeds are measured, and their arithmetic average is formed. The wheel with the speed which has the smallest deviation from this average value is selected as reference wheel. As mentioned above, this reference wheel selection avoids balancing with respect to an unfavorable wheel. The coarse balancing is also carried out in the case of an activated system intervention, for example braking intervention in the case of TSC or GDB (regulated differential brake in which the slipping wheel is braked down to vehicle speed using the present wheel brake instead of locking the differential), engine torque intervention in the case of TSC, central locking activation in the case of all-wheel drive, and the like. The quick coarse balancing with respect to a selected reference wheel is logical, since the influence of the drive torque on the dynamic tire rolling circumference is smaller in the relevant range than the influence of tires for mixed and extreme conditions.

Thereafter the next step is taken (step 4), in which the actual scaling factor determination is carried out within the framework of quick coarse balancing. The first step for this purpose is to prescribe initial values for the scaling factors. The reference wheel is set in this case to a constant, permanently prescribed scaling factor initial value, with the result that there is a constant orientation of all the wheel speeds to a fixed value in order, as mentioned above, to prevent a gradual drifting away of the correction factors. The effect of this is that repeated, unfavorable changing to and fro of unfavorable tires does not escalate the scaling factors as far as prescribed minimum or maximum values. The remaining three initial scaling factors are assumed as far as possible from preceding wheel speed balancing, so that the fresh coarse balancing can be terminated as quickly as possible. For this purpose, four instantaneous scaling factors are stored after an engine stop in each case. If the previous values are not available, all the scaling factors can alternatively be set initially to the same initial value.

After stipulation of initial scaling factors, the wheel speeds are now determined. After suitable filtering, a determination is made of scaling factors which belong to the measured wheel speed and are referred to the reference wheel and which are yielded from the quotient of the reference wheel speed and the speed of the wheel under consideration. After filtering of these scaling factors which have been determined, for each wheel the difference is formed between the still valid scaling factor and the scaling factor determined, and this difference is likewise subjected to filtering. Subsequently, the new scaling factor is formed by incrementally increasing or decreasing the still valid, previous scaling factor for each wheel, with the direction of the stepwise change in value being yielded from the sign of the scaling factor difference determined. In this case, it is possible for the purpose of increasing the rate of calibration to select instead of an increase by 1 a higher increment which is set in terms of absolute value to a fraction of the difference determined, so that the rate of calibration rises with higher instantaneous deviation and is reduced to the desired value with an increasing approximation after a plurality of program cycles. In a typical application, in which the permanently prescribed scaling factor is set to the value of 10,000, the higher increment is selected, for example, as the next integer above one twenty-fifth of the difference determined.

The possibly recursive behavior is generated by a subsequent interrogation (step 5) in which it is established for each wheel whether the difference determined between the scaling factor determined by the wheel speed and the scaling factor previously present does not overshoot in terms of absolute value a prescribed maximum value which, for example, amounts to 0.1% deviation with respect to the permanently prescribed initial wheel speed. If overshooting occurs for at least one wheel, a return is made to before step 4, after which renewed wheel speed measurement and, subsequently, a renewed incremental change in scaling factor are undertaken. If all the differences determined are below the prescribed value, quick coarse balancing is terminated. In order not to "calibrate away" any existing drive slip of the rear wheels at the end of quick coarse balancing, an offset value dependent on engine torque is subsequently added to the two rear wheel scaling factors, for example the scaling factors are raised by 0.4% if the drive torque amounts to +1,000 Nm and are reduced by 0.2% if the drive torque amounts to −500 Nm (step 6).

After this non-recurring measure of coarse balancing after an engine start, an interrogation is subsequently made (step 7) as to whether the conditions are present for fine balancing of the rear wheels with respect to the front wheels on the same side. Assumed for this purpose are: driving which is virtually free from drive torque at a speed of more than 45 km/h (so that, when cornering, a front axle/rear axle Ackermann correction is no longer required); cornering which is not excessive, for example steering angle of less than 50°; no brake actuation, detected via the braking light contact; and no excessive vehicle acceleration or non-stationary cornering of the vehicle.

If it is detected that all the above conditions are observed in this interrogation step, the actual fine balancing determination of the scaling factors (step 8) is begun. For this purpose the rear wheel speeds are firstly measured again, the values obtained are filtered and scaling factors for the rear wheels are determined therefrom, which scaling factors are yielded from the quotient of the corrected speed of the front wheel on the same side and the measured speed of the rear wheel. After filtering these determined rear wheel scaling factors, the difference between the previously present rear wheel scaling factors and those freshly or most recently determined is formed in turn and subjected to filtering. Thereafter, a fine incremental increase in the previous, still valid respective rear wheel scaling factor takes place in a direction prescribed by the sign of the difference determined.

The fineness of this balancing by comparison with the coarse balancing described above can be seen from an example in which in the case of coarse calibration there is a step increase of at least one unit per ten program cycles at 15 ms, while in the case of fine balancing matching is performed by one unit per 100 program cycles at 15 ms in this case. In a typical example, it is possible in the case of this fine calibration at a driving speed of 50 km/h to correct the wheel to be calibrated in one minute by 0.2 km/h (i.e., by 0.4%/min). After the incrementation of the rear wheel scaling factors, which can, as already mentioned, be performed in the direction of larger or, as actual decrementation, smaller scaling factor values, these new valid rear wheel scaling factors are used to form corrected rear wheel speeds, specifically respectively as the product of the measured rear wheel speed and the new valid scaling factor of the relevant rear wheel. The corrected rear wheel speeds, finely balanced with respect to the front wheels on the same side, are present for the rear wheels after filtering of these values. Thereupon, a return is made to before the fine balancing interrogation step in order to initiate renewed fine balancing and in this way to have present continuously balanced wheel speeds. Alternatively, it is possible to repeat the fine balancing only at relatively long intervals.

If it is established in the interrogation step for fine balancing on the same side that at least one of the conditions is not met, an interrogation is made in the next step (step 9) as to whether mutual fine balancing of the wheels on the same axle, that is to say on the left-hand front relative to the right-hand front and of the left-hand rear relative to the right-hand front wheels, is possible. In contrast to fine balancing on the same side, such fine balancing is also possible given the occurrence of a relatively large drive torque and thus rear axle crown wheel torque. The further conditions essentially correspond to those for fine balancing on the same side, although only a smaller amount of cornering is permitted. In this case, a steering angle of 20° is initially permitted, and is reduced successively down to 3° after repeated overshooting of the scaling factors.

If one of the interrogated conditions is not met, the method returns to the stage before the interrogation for fine balancing on the same side. If it is detected that the conditions are met, the actual fine balancing of the front left-hand wheel relative to the front right-hand one and, at the same time, of the rear left-hand wheel relative to the rear right-hand one are carried out (step 10). For this purpose, a start is made by measuring the speeds of the two left-hand wheels, the values obtained are filtered, and used to determine associated scaling factors for these wheels by way of the quotient of the corrected speed of the associated right-hand wheel and the measured speed of the left-hand wheel. After filtering of the new scaling factors for the left-hand wheels, the differences between previously present scaling factors and those determined for the left-hand wheels are calculated in turn in the way described above, and these difference values are filtered.

Subsequently, the scaling factors of all the wheels are incrementally increased or reduced in the direction prescribed in each case by the deviation differences determined. These new, now valid scaling factors are used to determine the corrected wheel speeds anew as the product of the previous wheel speeds and their new scaling factors. Thus, in contrast to fine balancing on the same side, the scaling factors of the two wheels to be balanced are moved up towards one another incrementally in the case of fine balancing on the same axle. This yields in conjunction with the same increment a higher calibration rate of, for example, 0.8%/min. That is, it is possible in the case of a driving speed of 100 km/h to correct a front or rear axle left/right deviation by 0.8 km/h.

After termination of the fine balancing on the same axle, a return is made to the stage before the interrogation for fine balancing on the same side, as a result of which the program of the method is inherently closed. It is not explicitly represented that, as already mentioned above, in the event of a later engine stop the wheel speed scaling factors present are stored, in order to serve after a later renewed engine start as initial values for coarse balancing. Moreover, suitable safety thresholds are integrated into the program of the method of the present invention, for example minimum and maximum values for the scaling factors in order to intercept any errors in measurement and calculation.

The method of the present invention permits quick and precise wheel speed balancing. One program cycle including detection of the measured values, filtering and calculation of the variables lasts 15 ms or shorter. In the case of vehicles with automatic transmissions, the drive torque, (i.e., the rear axle crown wheel torque), is determined via the turbine torque, for which purpose the engine torque, if present, is detected directly or the turbine torque is calculated from the throttle angle, engine speed and converter characteristics map. The steering wheel angle is determined from the left/right deviation of the front wheels and the vehicle reference speed, for which purpose the front wheel speeds are correspondingly conditioned.

The algorithm described delivers a wheel speed balancing accuracy of, at most, 0.1% deviation between all the four wheel speeds corrected by the speed scaling factors in conjunction with slip-free rolling. The wheel speed balancing method can be used with slight modifications in vehicles having different tire slip control systems, such as ABS, TSC, SMR (fast torque regulation on longitudinal dynamic behavior regulation systems) and GDB.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for providing a tire pressure warning in a motor vehicle, comprising the steps of:

first, determining a wheel speed scaling factor for each respective wheel that is to be monitored in terms of tire pressure, based on respective wheel speeds measured during a wheel speed balance in which the motor vehicle travels without braking above a minimum speed with a degree of cornering below a predetermined limit value for cornering and a driving torque below a predetermined limit value for driving torque;

second, combining the wheels, to be monitored in terms of tire pressure, in pairs and calculating a difference of the associated wheel speed scaling factors for each pair of wheels;

third, comparing said wheel speed scaling factors and determining a greatest difference of the wheel speed scaling factors between the pairs of wheels;

fourth, comparing said greatest difference with a predetermined threshold value;

d.1) repeating steps a) to d) if a predetermined number of cycles has not yet been reached, and otherwise d.2) output a warning signal to display an excessive tire pressure deviation.

fifth, if said greatest differences exceeds the predetermined threshold value, determining whether said greatest difference has exceeded the predetermined threshold value in a predetermined number of prior iterations of said first through fourth steps;

sixth, if said greatest difference has exceeded the predetermined threshold in a predetermined number of said prior iterations, outputting a warning signal to display an excessive tire pressure deviation; and seventh, if said greatest difference has not exceeded the predetermined threshold in a predetermined number of said prior iterations, repeating said first through sixth steps.

2. Method according to claim 1, wherein said first step comprises performing a speed balance in pairs of wheels on the same axle;

said second step comprises combining the wheels on one axle in pairs in each case.

3. Method according to claim 2, wherein said predetermined number of cycles is preselected as a function of a maximum scaling factor difference determined.

4. Method according to claim 3, further comprising the step:

eighth, calculating an arithmetic mean of all wheel speed scaling factors and differences of the individual wheel speed scaling factors from this arithmetic mean, and indicating the wheel with the greatest difference as that with the excessive tire pressure deviation.

5. Method according to claim 1, wherein said predetermined number of cycles is preselected as a function of a maximum scaling factor difference determined.

6. Method according to claim 5, further comprising the step:

eighth, calculating an arithmetic mean of all wheel speed scaling factors and differences of the individual wheel speed scaling factors from this arithmetic mean, and indicating the wheel with the greatest difference as that with the excessive tire pressure deviation.

7. Method according to claim 2, further comprising the step:

eighth, calculating an arithmetic mean of the wheel speed scaling factors and differences of the individual wheel speed scaling factors from this arithmetic mean, and indicating the wheel with the greatest difference as that with the excessive tire pressure deviation.

8. Method according to claim 1, further comprising the step:

eighth, calculating an arithmetic mean of the wheel speed scaling factors and differences of the individual wheel speed scaling factors from this arithmetic means, and indicating the wheel with the greatest difference as that with the excessive tire pressure deviation.

9. Method according to claim 1, wherein said wheel speed balance further comprises incrementally adjusting previously determined wheel speed scaling factors in a direction of scaling factor values corresponding to actually measured speeds of the respective wheels.

* * * * *